United States Patent [19]

Postal

[11] 3,801,324

[45] Apr. 2, 1974

[54] NON-CONFLICTING DOUBLE IMAGE PHOTOGRAPHIC FILM EMPLOYING SILVER BASED AND PHOTOFLUORESCER COMPOUNDS

[75] Inventor: Robert Harrison Postal, Clifton, N.J.

[73] Assignee: American Cyanamid Company, Stamford, Conn.

[22] Filed: Dec. 29, 1972

[21] Appl. No.: 319,280

[52] U.S. Cl............................ 96/82, 96/45.1, 96/68, 96/87 R
[51] Int. Cl............................................. G03c 1/92
[58] Field of Search............................ 96/82, 68, 87

[56] References Cited
UNITED STATES PATENTS

| 3,719,571 | 3/1973 | Zweig | 117/33.5 T |
|---|---|---|---|
| 3,673,153 | 3/1954 | Talbot | 96/82 |

*Primary Examiner*—Ronald H. Smith
*Attorney, Agent, or Firm*—Charles J. Fickey

[57] ABSTRACT

Photographic film element having photographic medium and optically active medium for providing identifying indicia, the optically active medium being a compound which is converted to a fluorescent state by short wave ultraviolet radiation and may be read by longer wave ultraviolet.

7 Claims, No Drawings

NON-CONFLICTING DOUBLE IMAGE PHOTOGRAPHIC FILM EMPLOYING SILVER BASED AND PHOTOFLUORESCER COMPOUNDS

This invention relates to a photographic film product having a photosensitive material for recording images and an additional optically active medium for providing identifying indicia on the photographic film surface, and to the method for using such product.

Motion picture or other photographic film is ordinarily identified according to the manufacturer and type (e.g., cellulose acetate or cellulose nitrate) by exposing letters or symbols photographically along the margins of the raw or unprocessed film. Upon development, these markings become visible and permit identification of the film.

The difficulty with such a means of identification is that each foot of film must be separately inspected, which is a somewhat laborious process. Identification is made even more difficult when separate lots of film are spliced together and different types of film are made into a single strip. Rapid identification of film is quite important in recovery of scrap film or in the vault storage of film where cellulose acetate type must be distinguished from cellulose nitrate type film.

Another method for identifying photographic film, proposed in the prior art was the use of marks of a fluorescent material on the film which would fluoresce under appropriate radiation and could be read. The problem with this type of identification was that the particular indicia had to be printed, or otherwise placed on the film in the form in which it was to appear to the view. In other words if the mark was to be a letter "A," the fluorescent material had to be placed on the film in the form of this letter. If the identification were to be only between two, or a relatively limited number of types or batches of photographic film, this could be by the use of different types of fluorescent materials. It is however apparent that these systems are relatively limited in scope.

It is, therefore, an object of our invention to provide a new photographic element. A further object is to provide a method for distinguishing one film type from another quickly and accurately. Still another object is to provide a new composition of matter. Another object is to provide a photographic element where identifying marks may be put on optically after exposure of the film, and directly over any image. A further object is to provide a photographic element where the added information may be placed on the film in analog form. Other objects will become apparent from a consideration of the following description and examples.

This disclosure describes a novel photographic film format in which a given photographic frame or area contains two superimposed, different photographic images and/or information, each of which may be made independently visible by appropriate means. The images are composed of photosensitive chemicals of such diverse physical nature that each image may be visually presented independently of one another and without visible interference between the two of any kind.

The method of fabricating a photographic film with the above indicated special properties may be accomplished as described below. To one skilled in the art, other constructions and geometric positioning in depositing the light active material may be considered: however, the description given represents one of many workable methods.

A film capable of forming compatible, non-conflicting double and different images is fabricated by coating conventional silver based black and white or color film with a thin, transparent layer of a photofluorescer compound. While the photofluorescer may be incorporated into a suitable vehicle and coated on top of the gelatin based silver halide coating, or even prepared by adding the photofluorescer to the silver halide gelatin emulsion prior to coating the substrate so as to contain the two image capability in a single layer, one may also choose to coat the back side of the substrate with a thin photofluorescer layer.

Whatever the method of obtaining photosensitive photofluorescer and silver based emulsions over the identical effective substrate area, it is a key point in this disclosure that the images formed by each system are due to entirely different photochemical reactions.

For example, assume a substrate with a layer of silver halide on one side and photofluorescer on the other. It is mandatory that the silver halide exposure be made first and that the film be developed, fixed, washed and preferably but not necessarily dried before exposing the photofluorescer coating. The photofluorescer coating is so formulated as to be not adversely affected by the foregoing processes. Additionally, the photofluorescer coating is not sensitive to ordinary indoor illumination or even sunlight since these sources at ground level do not contain radiation in the 2,500 – 2,600A range to which the photofluorescer is sensitive.

With the silver halide image developed and fixed, the photoflourescer layer may be printed on by exposure to short wave length (2,000 – 2,600A) radiation as may be obtained from a quartz mercury lamp.

The photofluorescer image thus formed does not absorb in the visible spectrum; hence, the previously formed silver halide image may be viewed or projected without interference. The photofluorescer image may be viewed in a darkened enclosure by illuminating the film with 3,800A "black light" and the silver based image (white or colored) cannot be seen and will not interfere with the fluorescent image.

Suitable photofluorescent compounds are disclosed in commonly assigned copending application Ser. Nos.: 848,557, filed Aug. 8, 1969, now U.S. Pat. No. 3,719,571; 221,470, filed Jan. 27, 1972; and U.S. Pat. No. 3,683,336 all of which are hereby incorporated by reference. These compounds are fluorescer precursors, that is they are not fluorescent when coated on the film, but are chemically converted by irradiation with short wave ultraviolet radiation to a new compound which will fluoresce under irradiation, with longer wave ultraviolet light. For examples, the compound 9,10-diphenyl-9,10-dihydroanthracene-9,10-anhydride is not fluorescent. Upon irradiation with ultraviolet light of 2,537A, 9,10-diphenylanthracene is formed which fluoresces under ultraviolet light of 3,800A or higher. The conversion of the precursor proceeds in analog fashion, and the intensity of emission of the fluorescent material will be dependent upon time of exposure of the precursor. For this reason the present invention is also useful for placing analog information on photographic. This can apply to placing a sound track on a moving picture film, and the sound track can be placed directly over the film frames.

Identification of microfilm frames can also be accomplished with the present invention. The identifying indicia can be placed directly over the film frames. Such indicia can be used to control location of particular frames in a microfilm reader.

As photographic film bases, cellulose esters which can advantageously be used in our invention comprise cellulose acetate. Cellulose propionate, cellulose butyrate, etc., mixed cellulose esters, such as cellulose acetate butyrate, etc., and cellulose nitrate. Our invention is particularly adaptable to the use of cellulose acetate containing, for example, from 35 to 44.8 per cent acetyl. The particular solvent, or mixture of solvents, used in the cellulose ester dope will depend on the acyl content of the ester. For example, cellulose acetate containing from about 39 to 41 per cent acetyl can be dissolved in acetone.

The film also comprises a photographic emulsion such as a silver-halide emulsion. Instead of a single photographic silver-halide emulsion, the support can be coated with a plurality of emulsions, for example, as shown in U.S. Pat. Nos. 2,350,764, dated June 6, 1944; 2,360,214, dated Oct. 10, 1944; 2,376,202, dated May 15, 1945; 2,391,198, dated Dec. 18, 1945; 2,403,721, dated July 9, 1946; etc. The photographic emulsion layer and those described in the above U.S. patents are the usual gelatino-silver halide emulsions customarily used in the art of black-and-white or multi-color reproduction. These emulsions can also consist of silver halide dispersed in other water-permeable colloidal materials, such as synthetic resins, e.g., polyvinyl alcohol, etc., cellulose ethers and ester, etc. Typical silver-halide emulsions include silver chloride, bromide, bromiodide, and chlorobromide types. The photographic silver-halide emulsions can contain the usual addenda, such as polymethine sensitizing dyes, antifoggants, etc.

The following specific Examples are given to illustrate the invention.

EXAMPLES I AND II

Cellulose Triacetate and Celanar polyester photographic films were coated with the following base solution.

| Base Solution | | |
|---|---|---|
| GEON 222 | 5.55% | |
| THF | 63.10% | |
| Toluene | 31.30% | (100 grams total) |

To this solution was added 0.5 grams of the 9.10 diphenylanthracene anhydride, giving a 9% concentration (based on Geon 222 solids).

The coating was made with a No. 18 Mayer Rod (wire wound rod).

The film was cut into 35 millimeter lengths.

Exposures were made on the film through a template with a short wave, low pressure, mercury arc lamp (Pen Ray).

The films were placed in a Nikor processing tank as used for conventional photographic development.

The film was then "developed" as follows:

| | |
|---|---|
| Kodak Microdol Developer | 11 minutes |
| Wash | 1 minute |
| Kodak Fixer | 10 minutes |
| Wash | 30 minutes |
| Dry | |

Post development evaluation of the films showed no degradation of the coating, image, or sensitivity to additional exposure.

EXAMPLE III

The same film as used in Examples I and II was first exposed to light to form a photographic image, then processed to develop the image as described in Examples I and II. The film was then exposed to a mercury arc lamp through a stencil to form indicia thereon. Afterward, the photographic image could be printed or visually viewed, and the film indicia could be identified by irradiation with long wave ultraviolet light. Neither operation interferred with the other.

I claim:

1. A photographic element comprising a light sensitive emulsion on a film base in combination with a photofluorescer.

2. The element of claim 1 wherein said photofluorescer is coated on the opposite side of said film base from the light sensitive emulsion.

3. The element of claim 1 wherein said photofluorescer is incorporated with said light sensitive emulsion.

4. The element of claim 1 wherein said photofluorescer is incorporated in said film base.

5. The element of claim 1 wherein said light sensitive emulsion is a silver-halide.

6. The element of claim 1 wherein said photofluorescer is 9,10-diphenyl-9,10-dihydroanthracene-9,10-anhydride.

7. The element of claim 1 wherein said film base is cellulose acetate.

* * * * *